Dec. 16, 1930.  W. M. HEINA  1,785,552
PORTABLE RADIO APPARATUS
Filed Dec. 14, 1928

William M. Heina
INVENTOR.

BY
ATTORNEYS.

Patented Dec. 16, 1930

1,785,552

UNITED STATES PATENT OFFICE

WILLIAM M. HEINA, OF LONG ISLAND CITY, NEW YORK, ASSIGNOR TO AUTOMOBILE RADIO CORPORATION, A CORPORATION OF DELAWARE

PORTABLE RADIO APPARATUS

Application filed December 14, 1928. Serial No. 326,100.

This invention relates to radio telephonic apparatus mounted on vehicles, or the like.

It is an object of this invention to provide in association with radio apparatus mounted upon an automobile, or the like, in close proximity to the position generally taken by the operator of said automobile, or, if desired, even in a position remotely located with respect to that of the operator, a control for said apparatus immediately adjacent the position necessarily taken by said operator, when directing the movements of said automobile.

It is a further object of this invention to provide in conjunction with the steering apparatus of a vehicle, a control for radio telephonic apparatus assembled with said vehicle, said radio apparatus being either within the easy reach of the operator of said vehicle, or substantially spaced from him, when sitting in the driver's seat of said vehicle.

It is another object of this invention to provide control means of the character and for the purpose described, which shall be of simple construction, easily assembled, cheaply manufactured, easily and simply operated by anyone, and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Figure 1:
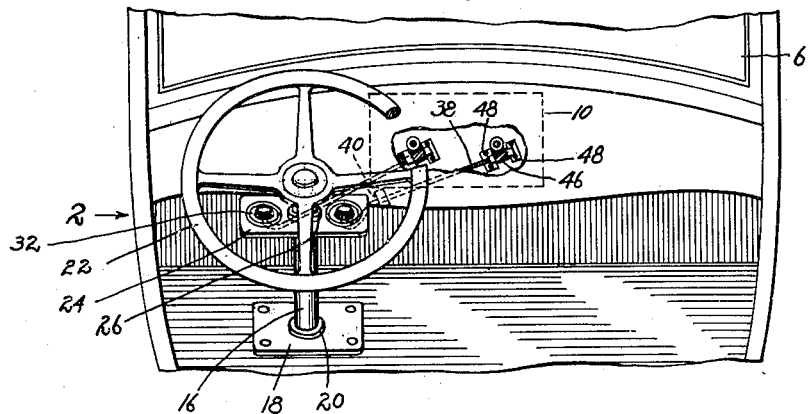
Figure 2:
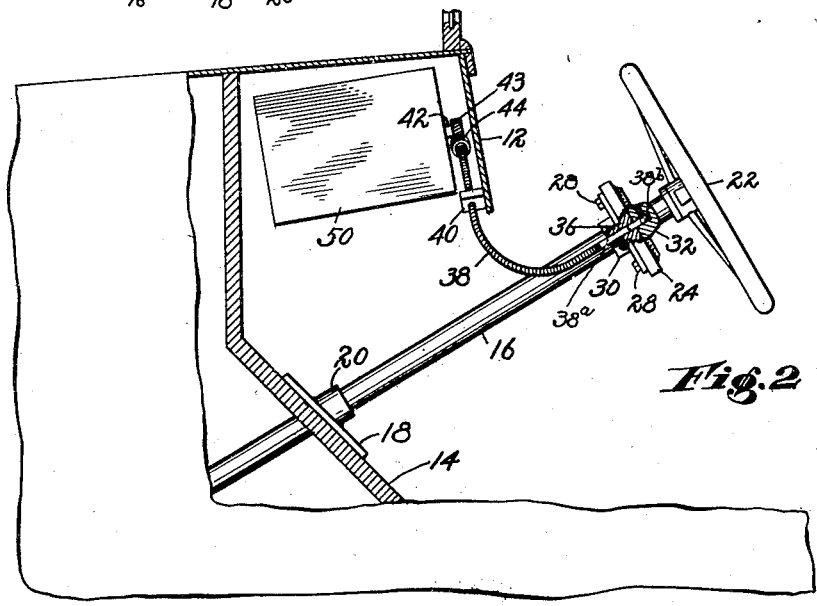

In the accompanying drawing, in which is shown one of the various possible illustrative embodiments of this invention, Fig. 1 is an elevational view of the steering gear and dashboard of an automobile, as seen from the driver's seat, together with other associated portions of the automobile, parts being broken away to clearly disclose the manner in which an embodiment of my invention is applied thereto; and Fig. 2 is a longitudinal sectional view of the arrangement shown in Fig. 1.

On the drawings, wherein is disclosed one embodiment of my invention, the body of an automobile, or the like, is indicated at 2, and is shown to have the control board or dashboard 12 carried thereby, in proximity to the windshield 6 and the steering apparatus including the column 16 and the wheel 22, relative to which the operator of said automobile necessarily takes his position. Mounted in any suitable manner on the control board or dashboard 12, and preferably in back of the latter, is the apparatus 10, which may consist of the coils, condensers, and other devices, either for transmitting, or receiving, signals, commonly known as wireless, or radio, signals. The control board 12 may serve as a front panel for the radio apparatus and upon said board 12 are mounted the indicators, and other visible paraphernalia of said apparatus. If desired, the apparatus 10 may extend through the dashboard 12 and may then be provided with a separate panel positioned so that its face is flush with the dashboard 12.

Extending up from, and through, the base boards 14, which form the floor of the automobile body 2, is the steering post 16, within which are housed the rotating elements of the steering apparatus 8. The position of post 16 with reference to the base boards 14 is fixed, preferably by the base plate 18, of any general design. Base plate 18 is secured to the base boards 14 in any desired manner, and is provided with a bored boss 20, through which the post 16 extends and within which it is secured. Mounted at the upper end of the post 16 is the steering wheel 22, of any desired type, with which may be assembled the controls for the automobile, in the customary manner.

In close proximity to the upper end of post 16, but preferably beneath the steering wheel 22, is located a control panel 24, formed of any desired material, and mounted on the post 16 in any suitable manner. As here shown, the panel 24 is formed of sheet material having a central hole 26 formed therethrough, whereby the panel may be slipped over the post 16, when the steering wheel 22 and its mounting parts have been removed from the upper end of post 16. Panel 24 is secured, by any desired fastening means 28, upon the face of a collar 30, which may be mounted on the post 16, either by being split, and having the two sections thereof assembled on post 16 by some contracting member, or by being driven, or sweated, onto post 16. The particular materials of panel 24 and collar 30 are of no great importance, except as they result in rigidity of construction for the purposes intended.

Mounted upon panel 24 are one or more dials 32, removably held to circular blocks 36 journaled in apertures formed in the panel 24. A set screw cooperating with a pin 38 may serve to removably secure the dial 32 to a block 36, in the usual manner. Means are preferably provided to prevent axial displacement of the blocks 36, while permitting their rotation of panel 24, while permitting rotation of said dial relative to said face. Connected to the end of each block 36, in the preferred manner of connecting such devices, is one end of a flexible drive member 38, held in an aperture formed in a block 36, and freely hanging between a block 36 and a guide block 40. Guide block 40 is mounted in back of the dashboard 12, in such manner as to direct the other end of the flexible member 38 for the purposes hereinafter indicated.

The apparatus 10 is preferably of the type in which the contral of the operation thereof is carried out by rotating one or more shafts, which extend through, or adjacent, the panel 12. Since the panel 12 is located at an appreciable distance from the steering wheel 22, the dials, normally used in conjunction with such apparatus, if mounted on the panel 12, would be relatively in accessible to the operator of the automobile, during the time the automobile was being guided, while in motion. For the purpose of providing an accessible control for said apparatus, the ends of the flexible drive members 38 are connected in such manner that the dials 32 provide the necessary control for the regulation of the apparatus 10, so that the operator, without any movement from his driving position, may adjust said apparatus for the use thereof.

These purposes are attained by securing, on the ends of the shafts 42 of the tuning units, such as the variable condensers, couplers, or the like, housed within the casing 50 of apparatus 10, one gear 43 of a pair of helical or spiral gears 44, the other gear 46 of each pair being secured to the end of a corresponding flexible cable 38, and being retained in operative position, relative to the gear 43, by a pair of bearing lugs 48, carried on the casing 50 of the apparatus 10, or, if preferred, upon the panel 12. By this arrangement, rotating the dials 32 regulates apparatus 10 so that the operator of the automobile may, without the necessity of moving from the steering position, use said apparatus during the time the automobile is in motion.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing is to be interpreted as illustrative and not in a limiting sense.

Having thus described my invention, I claim as new and desire to secure by Letters Patent:

1. In combination with a vehicle having means for controlling movement thereof positioned for operation by the driver of said vehicle, said means including a steering column, a radio telephonic instrument mounted at a distance from said column, and apparatus extending from said column for governing said instrument.

2. In combination with a vehicle having means for controlling movement thereof positioned for operation by the driver of said vehicle, said means including a steering column, a radio telephonic instrument mounted at a distance from, and under the observation of, said driver, and apparatus mounted on said column for regulating said instrument.

3. In combination with a vehicle having guiding means including a steering column and a steering wheel, a radio instrument mounted at a distance from said guiding means, apparatus mounted on said column in proximity to said wheel for remotely controlling said instrument, and a flexible cable cooperating with said apparatus extending from the latter to said instrument.

4. In combination with a vehicle having a control board in front of the driver's seat, and guiding means including a supporting column and a steerng wheel, a radio instrument mounted on said control board, apparatus mounted on said column in close proximity to said wheel for remotely controlling said instrument, and a flexible drive in liaison with said apparatus and said instrument.

5. In a vehicle having guiding means including a manually operable steering mechanism, a radio apparatus mounted on the vehicle at a distance from the steering mechanism, a radio control means mounted on said steering mechanism in close proximity to the hands of the operator of the vehicle while steering the latter, and an operable connection between said control means and said apparatus, whereby the latter may be remotely controlled.

6. In a vehicle having guiding means and a control board, said guiding means including a manually operable steering mechanism, a radio apparatus mounted on the control board, remote control means for said radio apparatus mounted on the steering mechanism in close proximity to the hands of the driver of the vehicle while steering, and a flexible drive extending from the control means to said radio apparatus.

7. In a vehicle having guiding means including a manually operable steering mechanism, a radio apparatus mounted on the vehicle at a distance from said steering mechanism, a control panel clamped on said steering mechanism in close proximity to the hand operated part of said steering mechanism, a control member movably mounted on said control panel and an operable connection between said movable control member and the radio apparatus, whereby the latter may be remotely controlled.

8. In a vehicle having guiding means including a manually operable steering mechanism, a radio apparatus mounted on the vehicle at a distance from said steering mechanism, a stationary panel mounted on said steering mechanism and supported thereby, with portions extending on opposite sides of the axis of said steering mechanism, control members movably mounted on said panel, one on opposite sides of the axis of said steering mechanism, and an operable connection between each of said control members and said radio apparatus, whereby the latter may be remotely controlled.

In testimony whereof I affix my signature.

WILLIAM M. HEINA.